US008922255B1

(12) United States Patent
Young et al.

(10) Patent No.: US 8,922,255 B1
(45) Date of Patent: Dec. 30, 2014

(54) PWM CONTROLLER WITH DRIVE SIGNAL ON CURRENT SENSING PIN

(71) Applicant: Texas Instruments Incorporated, Dallas, TX (US)

(72) Inventors: George Young, Blackrock (IE); Seamus M. O'Driscoll, Cloyne (IE); Andrew B. Keogh, Glanmire (IE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/944,588

(22) Filed: Jul. 17, 2013

(51) Int. Cl.
*H03K 3/00* (2006.01)

(52) U.S. Cl.
USPC .......................................... 327/108; 327/112

(58) Field of Classification Search
USPC .................................................. 327/108, 112
See application file for complete search history.

(56) References Cited

U.S. PATENT DOCUMENTS

| | | | | | |
|---|---|---|---|---|---|
| 5,956,245 | A | * | 9/1999 | Rozman | 363/89 |
| 7,408,307 | B2 | * | 8/2008 | Ribarich | 315/291 |
| 7,436,127 | B2 | * | 10/2008 | Ribarich et al. | 315/291 |

* cited by examiner

*Primary Examiner* — Kenneth B. Wells
(74) *Attorney, Agent, or Firm* — William B. Kempler; Frederick J. Telecky, Jr.

(57) ABSTRACT

A PWM modulator as might be used in a power converter, a drive signal will be generated on an output pin of an integrated circuit PWM controller device which is used to drive the output when the modulator is required to be on.

1 Claim, 7 Drawing Sheets

US 8,922,255 B1

PWM CONTROLLER WITH DRIVE SIGNAL ON CURRENT SENSING PIN

CROSS-REFERENCE TO RELATED APPLICATIONS

This patent application claims priority from Great Britain Provisional Patent Application No. 1212741.1, filed Jul. 18, 2012, which is incorporated herein by reference in its entirety.

FIELD OF THE INVENTION

The present invention relates to Integrated Circuit Devices and in particular to using a device pin for more than one purpose.

BACKGROUND OF THE INVENTION

The basis of the invention is to select a pin whose function has some dead time when the pin is not in effective use and using it for another purpose during that time.

In a PWM modulator as might be used in a power converter, a drive signal will be generated on an output pin of an integrated circuit PWM controller device which is used to drive the output when the modulator is required to be on.

In power converter applications it is common to sense the current in the driven circuit, which may be the primary side of an isolation transformer within the converter.

DETAILED DESCRIPTION OF THE DRAWINGS

Figure 1:
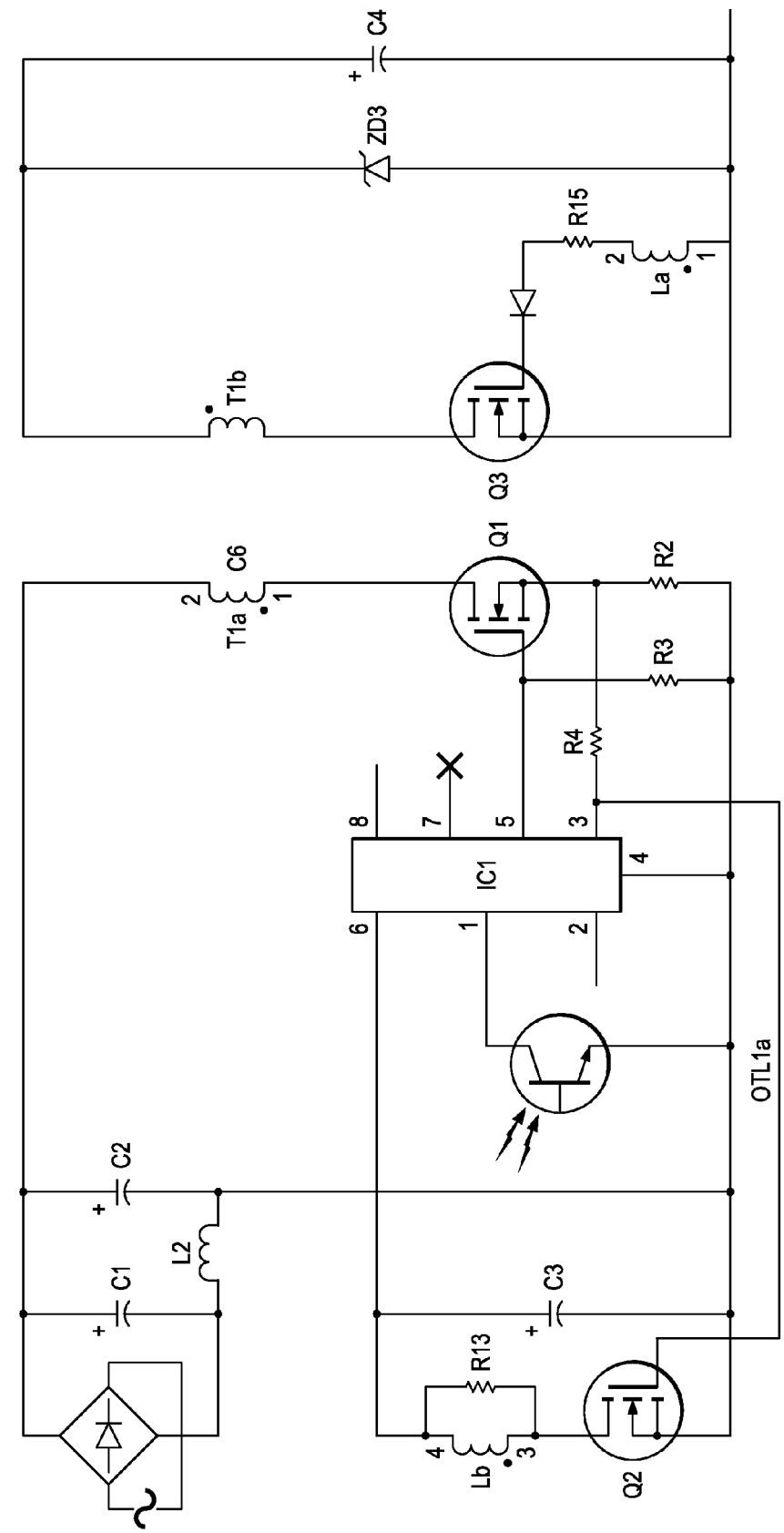
FIG. 1: Illustrative typical application circuit showing how pin 3 of the PWM IC is used for dual purpose.
Figure 2:
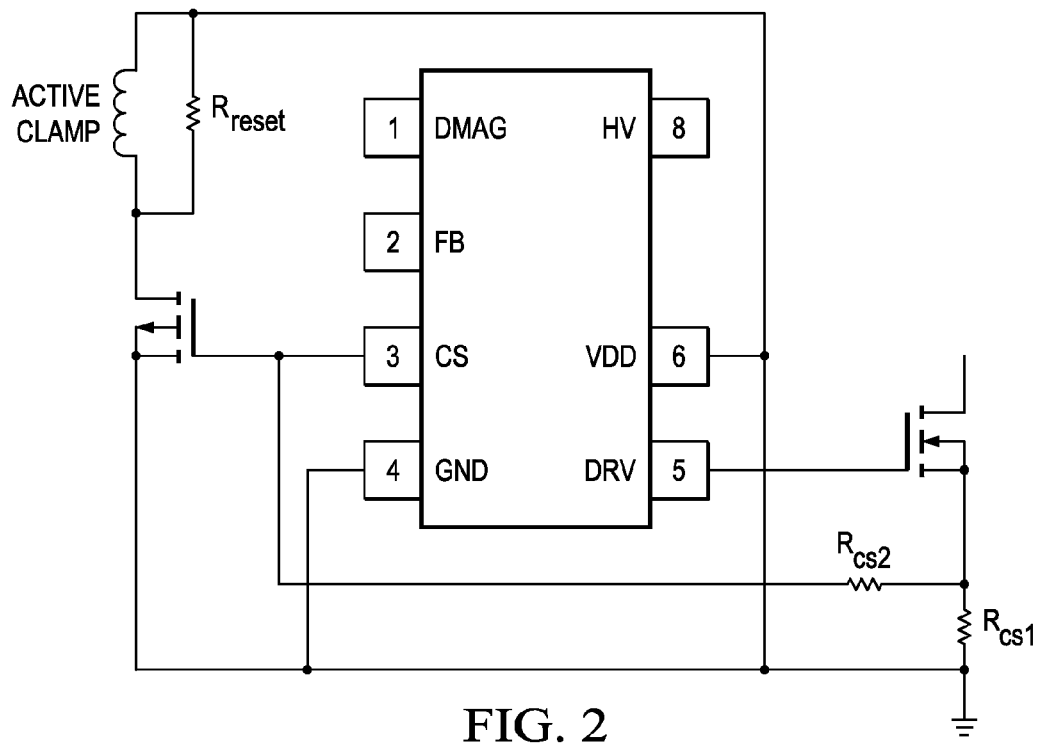
FIG. 2: Schematic of CS pin interface.
Figure 4:
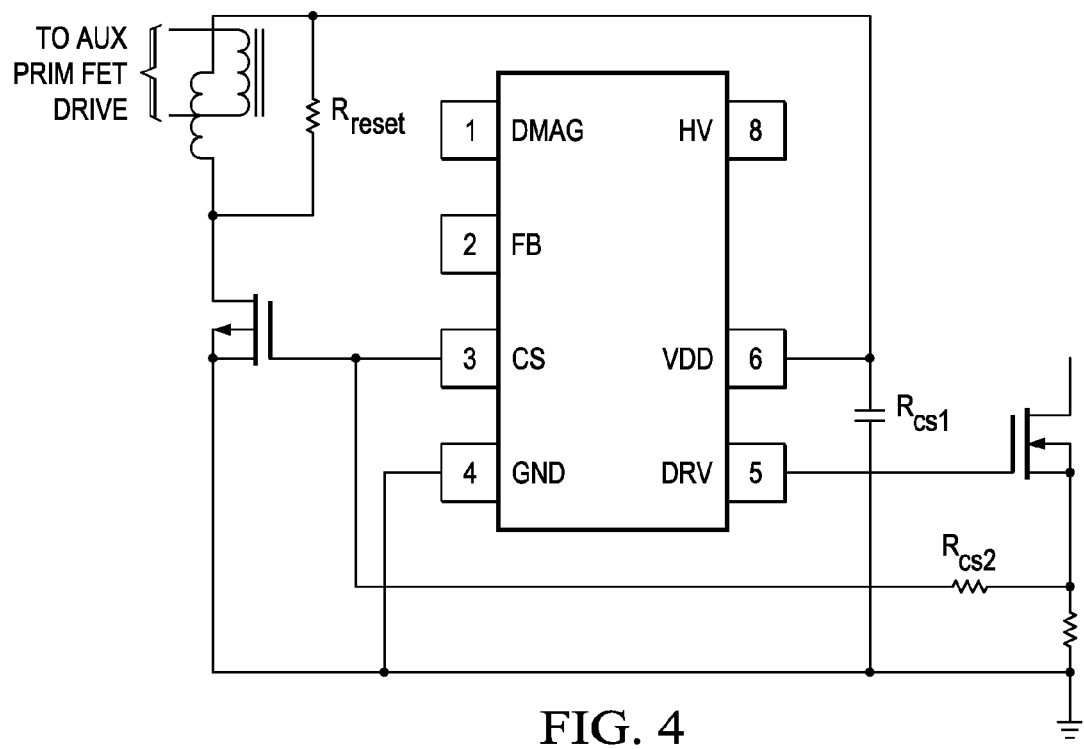
FIG. 4: Schematic of CS pin interface to both current sense signal and aux drive switch.
Figure 3:
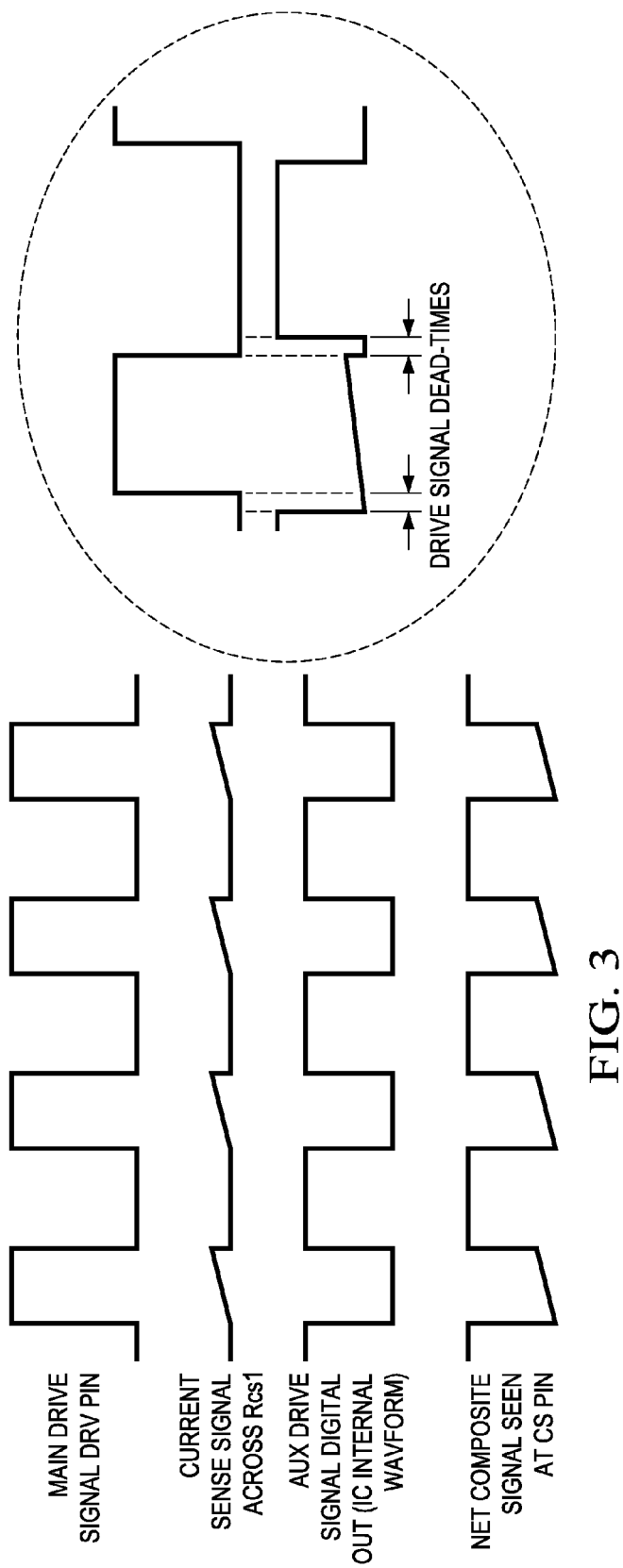
FIG. 3: Example waveforms seen at various points in the circuit of FIG. 2.
Figure 5:
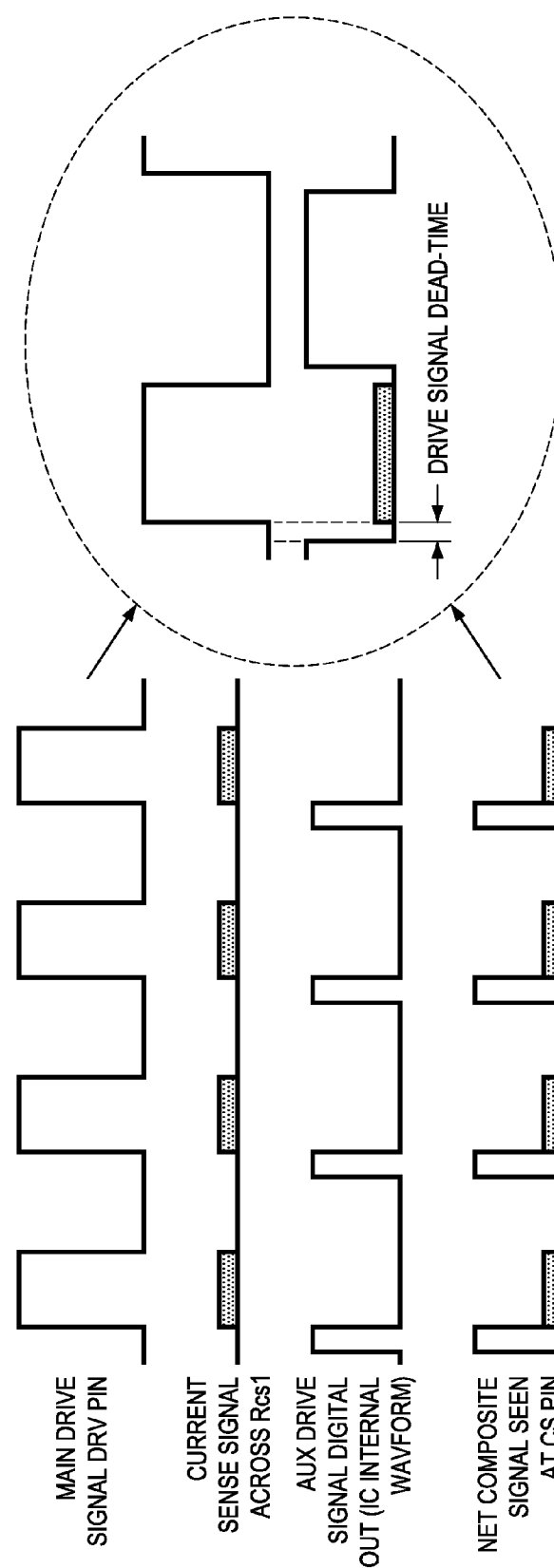
FIG. 5: Example waveforms seen at various points in the circuit of FIG. 4.
Figure 6:
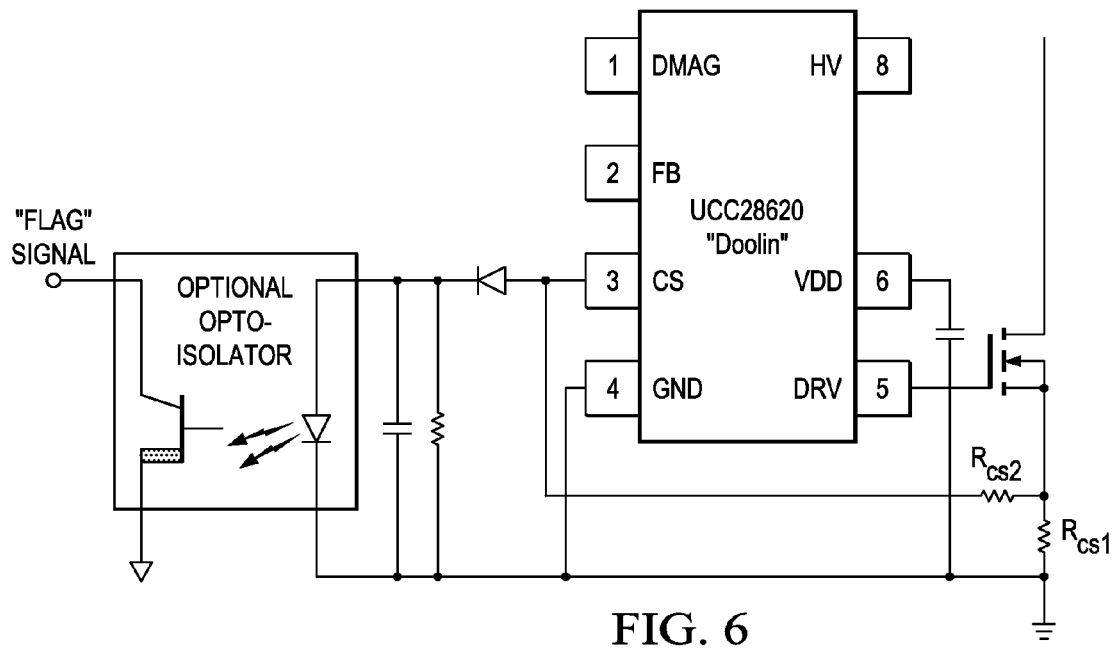
FIG. 6: Schematic of CS pin interface to both current sense signal and drive pulse peak detector.
Figure 7:
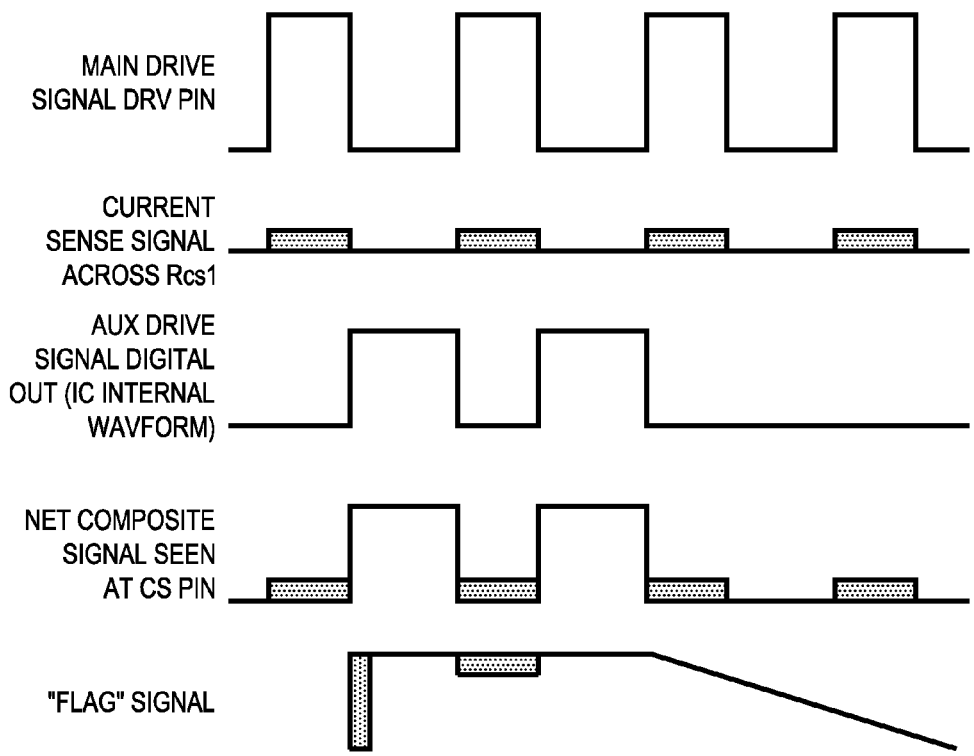
FIG. 7: Example waveforms seen at various points in the circuit of FIG. 6.

An exemplary circuit is shown in FIG. 1. A drive signal on pin 5 of IC1 drives a pwm signal to Q1 which in turn establishes current in primary winding T1*a*. This is coupled to secondary T1*b* to charge capacitor C4 in accordance with known power conversion techniques.

The operation of the circuitry is that the pin 3 operates to measure current when the power FET Q1 (typically in a flyback) is ON. When the main FET is off, then this current sense pin can be used for other purposes, such as for driving a synchronous rectifier FET.

When the FET Q1 is driven, then the current develops a voltage across R2, typically limited to 500 mV and materially below the threshold of Q2. Pin 3 under these conditions has a high impedance, and thus the voltage across R2 is read at pin 3 of IC 1 with minimal drop across R4.

When the FET Q1 is OFF, then pin 3 becomes configured as an output of nominal range 0 to perhaps 3.5V. R4 limits current through R2 when pin 3 is high. Pin 3 going high allows Q2 to be driven, typically for a width corresponding (allowing for switching delays, margin etc) to the desired operating time for synchronous rectifier Q3.

In the implementation as shown, a single pin, pin 3 serves not only as a current sense pin for the PWM controller but also as an output to control the synchronous rectifier Q3 used in power conversion.

Further exemplary possibilities will now be considered. Generate AUX drive signal that is complementary to main DRV output, with programmed dead-times—this can be used to drive secondary side Synchronous Rectifier (SR), or an auxiliary primary-side clamp switch for Active-Clamp type topologies. The drive signal may be directly coupled to a circuit on the same to a circuit on a floating or isolated ground.

Generate AUX drive signal that is not complementary to main DRV output, but is only active for a portion of the main DRV signal off-time. In this case the AUX on-time and the dead-times with the main DRV signal can be fixed, adjustable or adaptive with operating conditions. This non-complementary AUX signal can be used to drive an auxiliary primary-side switch for optimized Semi-Active-Clamp type topologies. The drive signal may be directly coupled to a circuit on the same ground, or magnetically, optically or otherwise coupled to a circuit on a floating or isolated ground.

Aux Drive may be pulse width or pulse position modulated with DRV off time.

Taking either type AUX drive signal from examples 1 or 2 above, and peak-detecting the "envelope" of the signal to provide a low frequency "flag" signal. This flag signal could be used as an enable/inhibit for other circuits, or to flag fault or power good conditions, or a low frequency signaling method for communication with another circuit. The communication signal may be directly coupled to a circuit on the same ground, or magnetically, optically or otherwise coupled to a circuit on a floating or isolated ground.

Taking either type AUX drive signal from examples 1 and 2 above, and modulating the signal as a burst, varying frequency and/or duty cycle of the burst within the main off-period. This burst signal could be used as a low frequency signaling method for communication with another circuit. Any number of signaling schemes could be employed e.g. AM (carrier duty cycle variation), FM (carrier frequency variation), FSK (carrier frequency shift keying), PSK (carrier phase shift keying), etc. The information can be encoded/decoded in various ways, the example below illustrates a very simple case. The communication could be used for a large number of purposes, communication with a host, or with the load, etc. The communication signal may be directly coupled to a circuit on the same ground, or magnetically, optically or otherwise coupled to a circuit on a floating or isolated ground.

Figure 8:
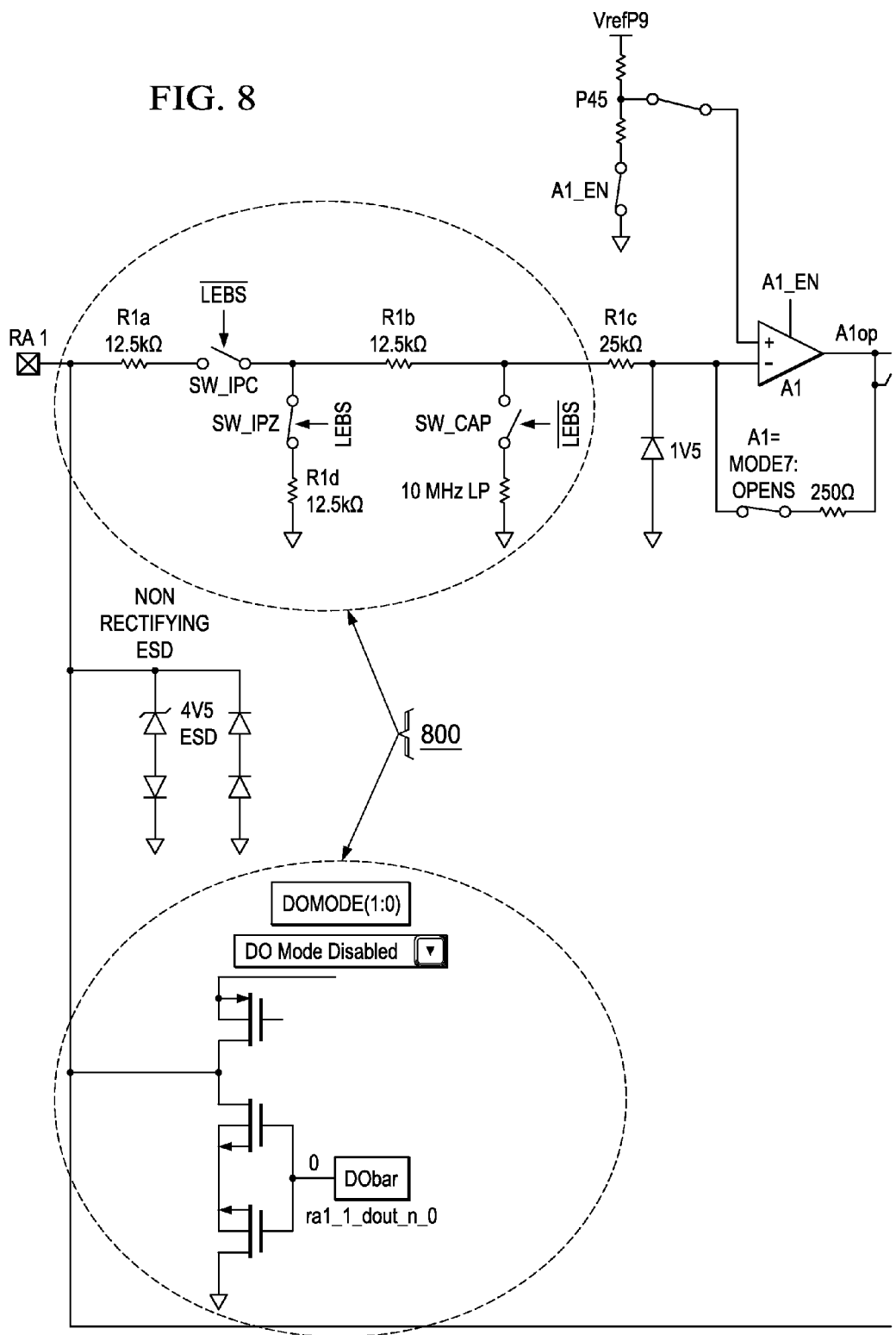
FIG. 8: Schematic of possible internal IC circuit & configuration to allow first dual purpose—(i) current sensing via the SW_IPC path into the internal current sense amplifier A1, while the driver block labelled DOMODE is in high-impedance mode or floating.

The internal circuitry of IC1 will now be considered. FIG. 8 shows, at 800, a standard IC1 configuration during "On-Time" with DO (Digital Output) mode disabled and SW_IPC closed (or under switched control) the CS pin pad configured as CS (Current-Sense) input (used to drive average current mode control loop to generate PWM signals).

Figure 9:
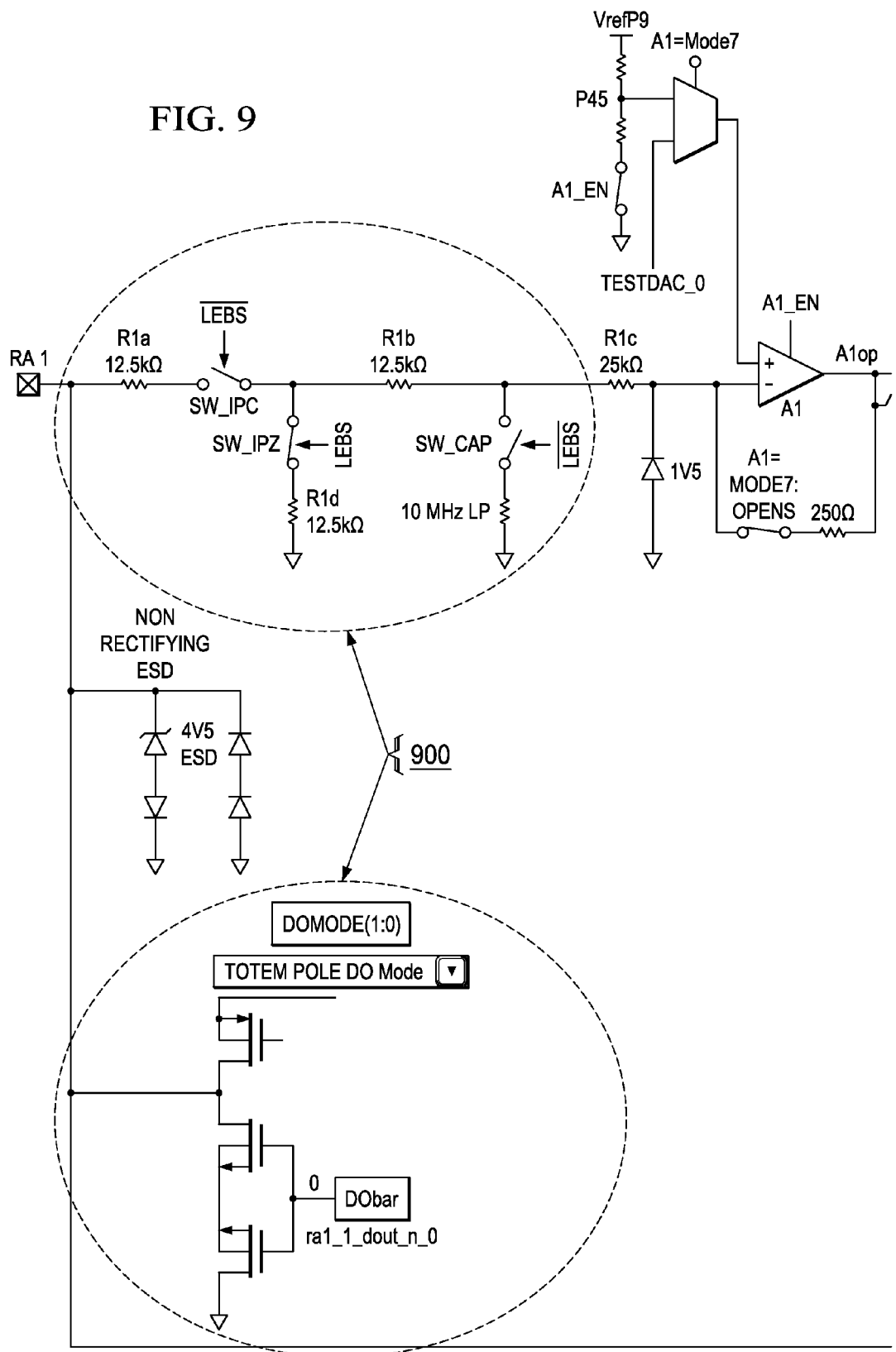
FIG. 9: Schematic of possible internal IC circuit & configuration to allow second dual purpose—(i) totem-pole or open drain pull-down driver operation by separately driving the upper/lower driver switches, while the current sense is isolated by opening SW_IPC and closing SW_IPZ.

FIG. 9 shows, at 900, an alternate IC1 configuration during "Off-Time with DO Mode set to "Totem-Pole" output, can drive digital TTL output signals to pad (CS pin), SW_IPC is opened to isolate the internal analogue circuitry, and SW_PZ is closed (to ensure that the current loop operates exactly as it otherwise would, i.e., SEES.

The invention claimed is:

1. An integrated circuit comprising a pin having some dead time when the pin is not in effective use for a first purpose, the pin being utilized for a different purpose during that time, wherein the pin is utilized to measure current when a power transistor of a voltage converter is ON, and used for driving a synchronous rectifier when the power transistor is OFF.

* * * * *